(12) United States Patent
Wang et al.

(10) Patent No.: US 9,309,360 B2
(45) Date of Patent: Apr. 12, 2016

(54) CELLULOSE ESTER BASED QUARTER WAVE PLATES HAVING NORMAL WAVELENGTH DISPERSION

(71) Applicant: Eastman Chemical Company, Kingsport, TN (US)

(72) Inventors: Bin Wang, Kingsport, TN (US); Thauming Kuo, Kingsport, TN (US); Michael Eugene Donelson, Kingsport, TN (US); Douglas Stephens McWilliams, Piney Flats, TN (US)

(73) Assignee: Eastman Chemical Company, Kingsport, TN (US)

( * ) Notice: Subject to any disclaimer, the term of this patent is extended or adjusted under 35 U.S.C. 154(b) by 7 days.

(21) Appl. No.: 14/108,810

(22) Filed: Dec. 17, 2013

(65) Prior Publication Data

US 2015/0168607 A1    Jun. 18, 2015

(51) Int. Cl.
*C09K 19/00* (2006.01)
*C08J 5/18* (2006.01)
*G02B 5/30* (2006.01)
*C08K 5/01* (2006.01)
*C08K 5/105* (2006.01)

(52) U.S. Cl.
CPC .............. *C08J 5/18* (2013.01); *G02B 5/3083* (2013.01); *C08J 2301/12* (2013.01); *C08J 2301/14* (2013.01); *C08K 5/01* (2013.01); *C08K 5/105* (2013.01); *Y10T 428/105* (2015.01); *Y10T 428/1036* (2015.01)

(58) Field of Classification Search
CPC ........ G02B 1/08; G02B 5/3083; G02B 27/26; C08J 5/18; C08J 2301/12; C08J 2301/14; C08L 1/08; C08L 1/10; C08L 1/12; C08L 1/14; Y10T 428/1036; Y10T 428/1041; Y10T 428/105; G02F 1/133634; G02F 2011/133637; G02F 2011/133638
USPC ................... 428/1.3, 1.31, 1.33; 359/489.11, 359/489.12, 489.13; 349/117
See application file for complete search history.

(56) References Cited

U.S. PATENT DOCUMENTS

| | | |
|---|---|---|
| 2,327,770 A | 8/1943 | Crane |
| 4,592,885 A | 6/1986 | Ichino et al. |
| 6,270,900 B1 | 8/2001 | Wakizaka et al. |
| 7,172,713 B2 | 2/2007 | Arai et al. |
| 7,697,095 B2 | 4/2010 | Toyama et al. |

(Continued)

FOREIGN PATENT DOCUMENTS

| | | |
|---|---|---|
| JP | 08-207210 A | 8/1996 |
| JP | 2004294798 A | 10/2004 |

(Continued)

OTHER PUBLICATIONS

Yamaguchi, Masayuki, et al., "Extraordinary Wavelength Dispersion of Orientation Birefringence for Cellulose Esters", Macromolecules, vol. 42, (2009) pp. 9034-9040.

(Continued)

*Primary Examiner* — Ruiyun Zhang
(74) *Attorney, Agent, or Firm* — Tammye L. Taylor

(57) ABSTRACT

The present invention pertains to an optical film for use as a quarter wave plate (QWP) having a normal wavelength dispersion curve. More specifically, this invention relates to a quarter wave plate based on cellulose ester polymer and fused ring additives.

25 Claims, 1 Drawing Sheet

(56) References Cited

U.S. PATENT DOCUMENTS

| | | | |
|---|---|---|---|
| 7,755,728 | B2 | 7/2010 | Ichihashi et al. |
| 7,879,994 | B2 | 2/2011 | Buchanan et al. |
| 7,976,914 | B2 | 7/2011 | Fukagawa et al. |
| 8,228,449 | B2 | 7/2012 | Lee et al. |
| 8,233,103 | B2 | 7/2012 | MacNaughton et al. |
| 8,310,528 | B2 | 11/2012 | Nagase et al. |
| 8,370,873 | B2 | 2/2013 | Shintani |
| 2003/0020208 | A1 | 1/2003 | Tasaka et al. |
| 2005/0133953 | A1 | 6/2005 | Yamazaki et al. |
| 2005/0192434 | A1 | 9/2005 | Buchanan et al. |
| 2007/0290168 | A1 | 12/2007 | Fukagawa et al. |
| 2008/0107829 | A1 | 5/2008 | Oya et al. |
| 2008/0137014 | A1 | 6/2008 | Toyama et al. |
| 2008/0192195 | A1 | 8/2008 | Liao |
| 2008/0213511 | A1 | 9/2008 | Ikeda et al. |
| 2008/0233311 | A1* | 9/2008 | Tamagawa ............ 428/1.31 |
| 2008/0241427 | A1 | 10/2008 | Harris et al. |
| 2009/0040454 | A1 | 2/2009 | Ichihashi et al. |
| 2009/0050842 | A1 | 2/2009 | Shelby et al. |
| 2009/0054638 | A1 | 2/2009 | Shelby et al. |
| 2009/0096962 | A1 | 4/2009 | Shelton et al. |
| 2010/0029927 | A1 | 2/2010 | Buchanan et al. |
| 2010/0055356 | A1 | 3/2010 | Takeda et al. |
| 2010/0267942 | A1 | 10/2010 | Buchanan et al. |
| 2011/0205459 | A1* | 8/2011 | Lee et al. ............... 349/13 |
| 2011/0236603 | A1 | 9/2011 | Hagio et al. |
| 2012/0320313 | A1 | 12/2012 | Donelson et al. |

FOREIGN PATENT DOCUMENTS

| | | |
|---|---|---|
| JP | 2006293342 A | 10/2006 |
| JP | 2008197561 A | 8/2008 |
| JP | 2010044245 A | 2/2010 |
| JP | 2011-118370 A | 6/2011 |
| JP | 2013029553 A | 2/2013 |
| WO | WO 2010/019245 A1 | 2/2010 |

OTHER PUBLICATIONS

Uchiyama, Akihiko, et al., "Analysis of Extraordinary Birefringence Dispersion of Uniaxially Oriented Poly(2,6-dimethyl 1,4-phenylene oxide)/Atactic Polystyrene Blend Films" Jpn. J. Appl. Phys., vol. 42, (2003), pp. 3503-3507.

Uchiyama, Akihiko, et al., "Control of Wavelength Dispersion of Birefringence for Oriented Copolycarbonate Films Containing Positive and Negative Birefringent Units", Jpn. J. Appl. Phys., vol. 42, (2003), pp. 6941-6945.

Buchanan, Charles, et al., "Preparation of Cellulose [1-$^{13}$C] Acetates and Determination of Monomer Composition by NMR Spectroscopy", Macromolecules, vol. 24, (1991), pp. 3050-3059.

Pancharatnam, S., "Achromatic Combinations of Birefringent Plates", Proceedings of the Indian Academy of Science, Sec. A., vol. 41., 130-136 (1955).

Yoon, Tae-Hoon, et al., "Nontwist quarter-wave liquid-crystal cell for a high-contrast reflective display", Optics Letters, vol. 25, No. 20, (2000), pp. 1547-1549.

Gedon, Steven et al., "Cellulose Esters, Organic Esters", Kirk-Othmer Encyclopedia of Chemical Technology, Fifth Edition, vol. 5, (2004), pp. 412-444.

Notification of Transmittal of the International Search Report and the Written Opinion of the International Searching Authority, or the declaration with date of mailing Sep. 5, 2011 for International Application No. PCT/US2011/041329.

Co-pending U.S. Appl. No. 13/157,580, filed Jun. 10, 2011.

Co-pending U.S. App. No. 14/108,787, filed Dec. 17, 2013.

USPTO Office Action in Co-pending U.S. Appl. No. 13/157,580 dated Dec. 6, 2012.

USPTO Office Action in Co-pending U.S. Appl. No. 13/157,580 dated Jul. 31, 2013.

USPTO Office Action in Co-pending U.S. Appl. No. 13/157,580 dated Sep. 24, 2014.

European Search Report—Application No. 14002136.1-1301 dated Oct. 16, 2014.

Co-pending U.S. Appl. No. 14/548,821, filed Nov. 20, 2014.

Notification of Transmittal of the International Search Report and the Written Opinion of the the International Searching Authority, or the Declaration—International Application No. PCT/US2014/068494 with a mailing date of Feb. 20, 2015.

Office Communication date of notification Jun. 10, 2015 received in co-pending U.S. Appl. No. 13/157,580.

* cited by examiner

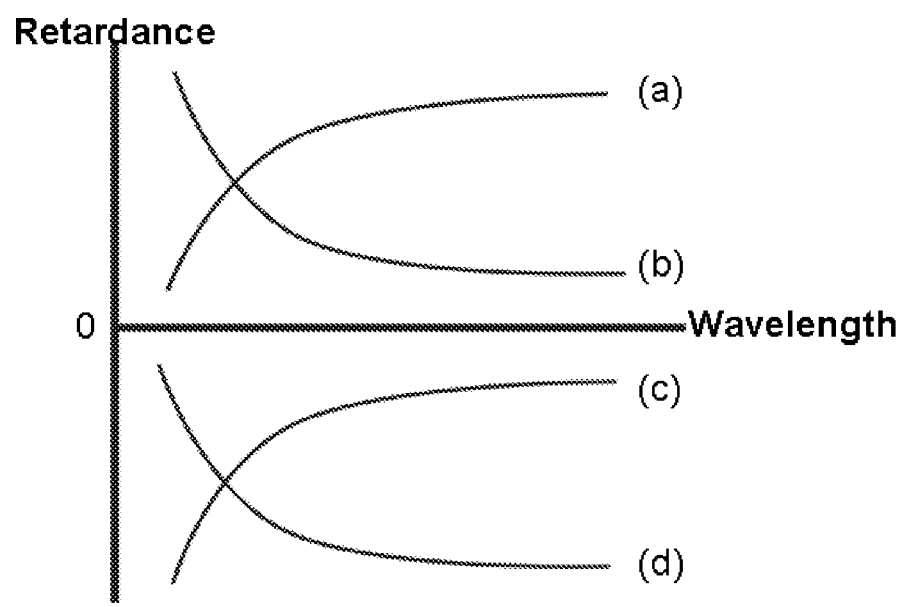

CELLULOSE ESTER BASED QUARTER WAVE PLATES HAVING NORMAL WAVELENGTH DISPERSION

FIELD OF THE INVENTION

This invention pertains to an optical film for use as a quarter wave plate (QWP) having a normal wavelength dispersion curve. More specifically, this invention relates to a quarter wave plate based on cellulose ester polymer.

BACKGROUND OF THE INVENTION

It is known in the art of optical compensation that the phase retardation of light varies according to wavelength, causing color shift and contrast ratio reduction. This wavelength dependence (or dispersion) characteristic of the compensation film may be taken into account when designing an optical device so that color shift is reduced and contrast ratio increased. Wavelength dispersion curves are defined as "normal (or proper)" or "reversed" with respect to the compensation film having positive and negative retardance (or retardation). A compensation film with positive retardance (positive A- or C-plate) may have a normal dispersion curve in which the value of phase retardation is increasingly positive toward shorter wavelengths or a reversed dispersion curve in which the value of phase retardation is decreasingly positive toward shorter wavelengths. A compensation film with negative retardance (negative A- or C-plate) may have a normal dispersion curve in which the value of phase retardation is increasingly negative toward shorter wavelengths or a reversed dispersion curve in which the value of phase retardation is decreasingly negative toward shorter wavelengths. Exemplary shapes of these curves are depicted in FIG. 1.

Wave plates are customarily named as follows in accordance with their refractive index profiles:
positive A-plate: $n_x > n_y = n_z$; negative A-plate: $n_x < n_y = n_z$; positive C-plate: $n_x = n_y < n_z$; negative C-plate: $n_x = n_y > n_z$, wherein, $n_x$ and $n_y$ represent in-plane refractive indices, and $n_z$ is the thickness refractive index.

The above wave plates are uniaxial birefringent plates. A wave plate can also be biaxial birefringent, where $n_x$, $n_y$, and $n_z$ all have different values; it is customarily referred to as a biaxial film.

An A-plate is a wave plate commonly used as a retarder in an optical device. It is a birefringent material capable of manipulating the polarization state or phase of the light beam traveling through the medium. The A-plate optical retarder has a refractive index profile of $n_x > n_y = n_z$, wherein $n_x$ and $n_y$ represent in-plane refractive indices and $n_z$ represents the thickness-direction refractive index. Such a wave plate exhibits a positive in-plane retardation ($R_e$) as expressed by $R_e = (n_x - n_y) \times d$, wherein d is the thickness of the wave plate. $R_e$ is also often denoted as $R_o$.

An A-plate having in-plane retardation ($R_e$) equal to a quarter of a light wavelength ($\lambda$), $R_e = \lambda/4$, is called quarter wave plate (QWP). A quarter wave plate is capable of converting an incident linearly polarized light into circularly polarized light. Thus, a quarter wave plate is commonly used in combination with a linear polarizer to provide a circular polarizer in an optical device. Circularly polarized light has been used in polarized three-dimensional (3D) display systems to produce stereoscopic image projection. Circular polarization has an advantage over linear polarization in that viewers are able to tilt their heads and move around naturally without seeing distorted 3D images. Such 3D display systems require viewers to wear glasses, commonly referred to as 3D glasses, equipped with circular polarizing films in order to see 3D images. Recently, there has been much increased interest in 3D consumer products such as TVs and computer displays. Thus, there is a demand for improved 3D glasses with circular polarizing films. Specifically, there is a need for a quarter wave plate having normal wavelength dispersion, which has been found to have the utility for 3D glasses to improve the viewing quality. It is known that such quarter wave plates can be achieved by using polycarbonate or cyclic polyolefin. However, in a device based on such quarter wave plates, a cellulose ester film is required to protect the polyvinyl alcohol based polarizer. It would be advantageous if the quarter wave plate is based on cellulose ester film and can also function as a protective film for the polarizer. Accordingly, this invention is further directed to quarter wave plates based on cellulose ester.

In order to have a normal wavelength dispersion curve, the in-plane retardation ($R_e$) of a quarter wave plate should satisfy the following equations:

$$R_e(450)/R_e(550) > 1 \text{ and } R_e(650)/R_e(550) < 1$$

wherein $R_e(450)$, $R_e(550)$, and $R_e(650)$ are in-plane retardations at the light wavelengths of 450 nm, 550 nm, and 650 nm respectively.

The positive A-plate, however, also exhibits a negative out-of-plane retardation $R_{th}$, which is defined as $R_{th} = [n_z - (n_x + n_y)/2] \times d$ with a value of $[R_e/2]$ arising from its orientation. The term "$|R_e/2|$" means the absolute value of $R_e/2$. This characteristic can be beneficial when a negative $R_{th}$ is desirable in an optical device. For example, in a vertically aligned (VA) mode liquid crystal display (LCD), the liquid crystal molecules in the LC cell are aligned in a homeotropic manner, which results in positive out-of-plane retardation. A wave plate with a negative $R_{th}$, thus, can provide an out-of-plane compensation in addition to in-plane compensation in VA-LCD. In other types of devices, such as in-plane switch (IPS) mode LCD and 3D glasses, however, the Rth exhibited in the A-plate is not desirable since it can give rise to phase shift in off-axis light and lead to light leakage. Thus, there exists a further need in the art to provide a quarter wave plate having reduced out-of-plane retardation for improved viewing quality.

BRIEF SUMMARY OF THE INVENTION

It has been surprisingly discovered that quarter wave plates comprising cellulose ester polymers and additives and having normal dispersion can be obtained.

In one aspect the present invention provides a uniaxially or biaxially stretched optical film for use as a quarter wave plate having a normal wavelength dispersion curve comprising,
(a) a cellulose ester polymer and
(b) an additive having the structure below:

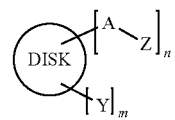

wherein DISK represents a disk-like moiety having a fused ring structure, A is each independently —COO—, —OOC—, —CO—, —CONH—, —NHCO—, —O—, or —S—; Z is each independently an aryl, alkyl, ethoxylated alkyl, or ethoxylated aryl group, having 1 to 30 carbon atoms; Y is each independently a halogen or alkyl-, alkoxy-, or alkanoyl-group having 1 to 20 carbon atoms, m=0, 1, 2, 3, or 4; n is the number of the independent -A-Z substituents on the DISK, n=0, 1, 2, or 3; and wherein the in-plane retardation ($R_e$) of said quarter wave plate satisfies the following equations:

$$R_e(450)/R_e(550)>1 \text{ and } R_e(650)/R_e(550)<1$$

wherein $R_e(450)$, $R_e(550)$, and $R_e(650)$ are in-plane retardations at the light wavelengths of 450 nm, 550 nm, and 650 nm respectively.

In one aspect, the optical film in accordance with this invention is a quarter wave plate having in-plane retardation ($R_e$) of about 100-160 nm at the wavelength (λ) 550 nm.

In another aspect, the optical film has an out-of-plane retardation ($R_{th}$) that satisfies the equation of $|R_{th}|<100$ nm throughout the wavelength range of about 400 nm to about 800 nm.

One aspect of the present invention provides a circular polarizer comprising
(1) a uniaxially or biaxially stretched optical film for use as a quarter wave plate having a normal wavelength dispersion curve comprising,
(a) a cellulose ester polymer and
(b) an additive having the structure below:

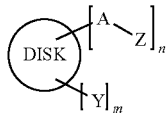

and
(2) a linear polarizer,
wherein DISK represents a disk-like moiety having a fused ring structure, A is each independently —COO—, —OOC—, —CO—, —CONH—, —NHCO—, —O—, or —S—; Z is each independently an aryl, alkyl, ethoxylated alkyl, or ethoxylated aryl group, having 1 to 30 carbon atoms; Y is each independently a halogen or alkyl-, alkoxy-, or alkanoyl-group having 1 to 20 carbon atoms, m=0, 1, 2, 3, or 4; n is the number of the independent -A-Z substituents on the DISK, n=0, 1, 2, or 3; and wherein the in-plane retardation ($R_e$) of said quarter wave plate satisfies the following equations:

$$R_e(450)/R_e(550)>1 \text{ and } R_e(650)/R_e(550)<1$$

wherein $R_e(450)$, $R_e(550)$, and $R_e(650)$ are in-plane retardations at the light wavelengths of 450 nm, 550 nm, and 650 nm respectively.

In one aspect of the present invention, the DISK comprises a fused ring compound comprising two or more individual rings that are connected by sharing at least one of their sides.

In one aspect of the present invention, the fused ring of the DISK comprises one or more of naphthalene, anthracene, phenanthrene, -pyrene, compound with structure 5, and compound with structure 6, 2-naphthyl benzonate, 2,6-naphthalene dicarboxylic diester, naphthalene, abietic acid ester and mixtures thereof.

In one aspect of the present invention, the cellulose ester polymer has an inherent viscosity of from about 0.8 to 1.9 dL/g.

BRIEF DESCRIPTION OF THE DRAWINGS

FIG. 1 is a graph depicting the shapes of exemplary wavelength dispersion curves for: (a) a reversed curve for positive retardation, (b) a normal curve for positive retardation, (c) a normal curve for negative retardation and (d) a reversed curve for negative retardation.

DETAILED DESCRIPTION

In one embodiment of the present invention, there is provided a uniaxially or biaxially stretched optical film for use as a quarter wave plate having a normal wavelength dispersion curve, comprising:
(a) a cellulose ester polymer and
(b) an additive having the structure below:

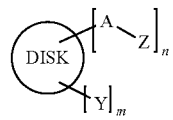

wherein DISK represents a disk-like moiety having a fused ring structure, A is each independently —COO—, —OOC—, —CO—, —CONH—, —NHCO—, —O—, or —S—; Z is each independently an aryl, alkyl, ethoxylated alkyl, or ethoxylated aryl group, having 1 to 30 carbon atoms; Y is each independently a halogen or alkyl-, alkoxy-, or alkanoyl-group having 1 to 20 carbon atoms, m=0, 1, 2, 3, or 4; n is the number of the independent -A-Z substituents on the DISK, n=0, 1, 2, or 3; and wherein the in-plane retardation ($R_e$) of said quarter wave plate satisfies the following equations:

$$R_e(450)/R_e(550)>1 \text{ and } R_e(650)/R_e(550)<1$$

wherein $R_e(450)$, $R_e(550)$, and $R_e(650)$ are in-plane retardations at the light wavelengths of 450 nm, 550 nm, and 650 nm respectively. The ethoxylated alkyl or ethoxylated aryl comprises a moiety of $-[-CH_2-CH_2-O-]_n-Z$ bonded to A, wherein n is an integer from 1 to 10.

Alternatively, Z may be independently an aryl, alkyl, ethoxylated alkyl, or ethoxylated aryl group, having 1 to 20 carbon atoms or having 1 to 15 carbon atoms or having 1-10 carbon atoms or having 1 to 5 carbon atoms.

Alternatively, Y may be independently a halogen or alkyl-, alkoxy-, or alkanoyl-group having 1 to 20 carbon atoms or having 1 to 15 carbon atoms, or having 1 to 10 carbon atoms or having 1 to 5 carbon atoms.

In the ethoxylated alkyl or ethoxylated aryl comprises a moiety of $-[-CH_2-CH_2-O-]_n-Z$ bonded to A, n is an integer from 1 to 10 or from 1 to 8 or from 1 to 6 or from 1 to 4 or from 1 to 2. Alternatively, in the ethoxylated alkyl or ethoxylated aryl comprises a moiety of $-[-CH_2-CH_2-O-]_n-Z$ bonded to A, n is an integer from 2 to 10 or from 4 to 10 or from 6 to 10 or from 8 to 10.

Examples of the cellulose ester polymer in (a) suitable for this invention include, but are not limited to, cellulose acetate (CA), cellulose acetate propionate (CAP), and cellulose acetate butyrate (CAB). The terms "cellulose ester" and "cellulose ester polymer" are used interchangeable herein. The terms refer to the condensation product from the reaction of a hydroxyl group on the cellulose with the carboxylic acid group of a carboxylic acid with the formation of water as a co-product. The cellulose esters may be randomly or regioselectively substituted. Regioselectivity can be measured by determining the relative degree of substitution (RDS) at $C_6$, $C_3$, and $C_2$ in the cellulose ester by carbon 13 NMR (*Macromolecules*, 1991, 24, 3050-3059). In conventional cellulose esters, regioselectivity is generally not observed and the RDS ratio of $C_6/C_3$, $C_6/C_2$, or $C_3/C_2$ is generally near 1 or less. In essence, conventional cellulose esters are random copolymers. In contrast, when adding one or more acylating reagents to cellulose dissolved in an appropriate solvent, the $C_6$ position of cellulose are acylated much faster than $C_2$ and $C_3$.

Consequentially, the $C_6/C_3$ and $C_6/C_2$ ratios are significantly greater than 1, which is characteristic of a 6,3- or 6,2-enhanced regioselectively substituted cellulose ester.

Non-limiting examples of the DISK moiety having a fused ring structure such as naphthalene (structure 1), anthracene (structure 2), phenanthrene (structure 3), pyrene (structure 4), (structure 5), and (structure 6) which are shown below:

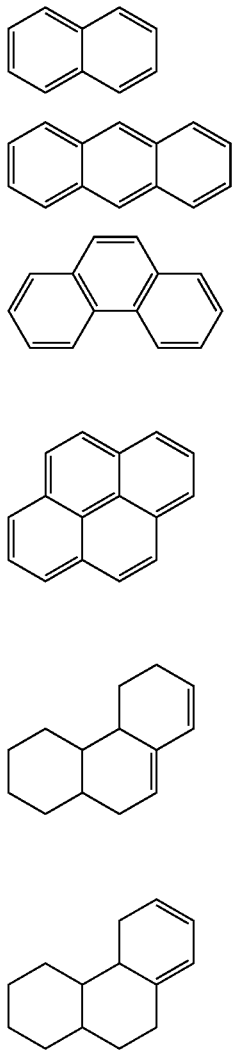

The "fused ring" structure may be understood to have two or more individual rings that are connected by sharing at least one of their sides. Each individual ring in the fused ring may be substituted or unsubstituted and is preferably a six- or five-membered ring, which are typically all-carbon. Individual rings in a fused ring may be aromatic or aliphatic. Preferred individual rings in a fused ring include, but are not limited to, aromatic rings and substituted aromatic rings, cycloaliphatic rings, substituted cycloaliphatic rings, partially unsaturated cycloaliphatic rings, and partially unsaturated, substituted cycloaliphatic rings.

Non-limiting examples of the additive in (b) suitable for this invention are 2-naphthyl benzoate, 2,6-naphthalene dicarboxylic acid ester, naphthalene, and abietic acid ester which are shown below:

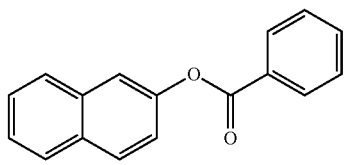

2-Naphthyl benzoate

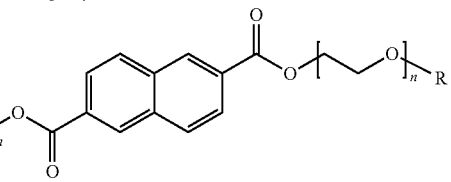

2,6-Naphthalene dicarboxylic acid ester

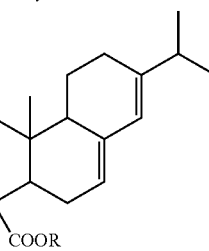   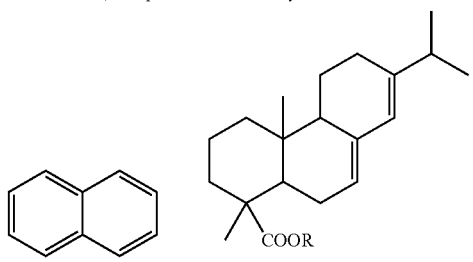

Naphthalene              Abietic acid ester wherein, R is each independently $C_1$-$C_{20}$ alkyl or $C_1$-$C_{20}$ aryl, and n is each independently an integer ranging from 0 to 6. When n=0, R is bonded directly to the carboxyl group. Alternatively, R is each independently $C_1$-$C_{15}$ alkyl or $C_1$-$C_{15}$ aryl, and n is each independently an integer ranging from 0 to 6. Alternatively, R is each independently $C_1$-$C_{10}$ alkyl or $C_1$-$C_{10}$ aryl, and n is each independently an integer ranging from 0 to 6. Alternatively, R is each independently $C_1$-$C_6$ alkyl or $C_1$-$C_6$ aryl, and n is each independently an integer ranging from 0 to 6.

The optical film in accordance with the present invention has a positive in-plane retardation ($R_e$) and a normal in-plane wavelength dispersion characteristic, in which the value of phase retardation is increasingly positive toward shorter wavelengths. This dispersion characteristic is expressed by the ratios of the retardations as measured at the wavelengths of 450 nm, 550 nm, and 650 nm, which satisfy the relations of $R_e(450)/R_e(550)>1$ and $R_e(650)/R_e(550)<1$. The ratio of $R_e(450)/R_e(550)$ can be 1.001 to 1.1, 1.005 to 1.08, 1.01 to 1.06, or 1.02 to 1.04. The ratio of $R_e(650)/R_e(550)$ can be 0.95 to 0.999, 0.96 to 0.996, 0.97 to 0.993, or 0.98 to 0.99. The films may have a combination of the ratio of $R_e(450)/R_e(550)$ ranging from 1.001 to 1.1 with the ratio of $R_e(650)/R_e(550)$ of 0.95 to 0.999, or 0.96 to 0.996, or 0.97 to 0.993, or 0.98 to 0.99. The films may have a combination of the ratio of $R_e(450)/R_e(550)$ ranging from 1.005 to 1.08 with the ratio of $R_e(650)/R_e(550)$ of 0.95 to 0.999, or 0.96 to 0.996, or 0.97 to 0.993, or 0.98 to 0.99. The films may have a combination of the ratio of $R_e(450)/R_e(550)$ ranging from 1.01 to 1.06 with the ratio of $R_e(650)/R_e(550)$ of 0.95 to 0.999, or 0.96 to 0.996, or 0.97 to 0.993, or 0.98 to 0.99. The films may have a combination of the ratio of $R_e(450)/R_e(550)$ ranging from 1.02 to 1.04 with the ratio of $R_e(650)/R_e(550)$ of 0.95 to 0.999, or 0.96 to 0.996, or 0.97 to 0.993, or 0.98 to 0.99.

Retardation (R) of a wave plate is defined as $R=\Delta n \times d$, wherein $\Delta n$ is the birefringence and d is the thickness of the wave plate. Birefringence is classified into in-plane birefringence $\Delta n_e = n_x - n_y$ and out-of-plane birefringence $\Delta n_{th} = n_z - (n_x + n_y)/2$. Thus, in-plane retardation is represented by $R_e = (n_x - n_y) \times d$ and out-of-plane retardation by $R_{th} = [n_z - (n_x + n_y)/2] \times d$, which is the definition used through-out this application. It is noted that some authors use the following definition $R_{th} = [(n_x + n_y) - n_z/2] \times d$ which gives a number of the same magnitude but with opposite sign. $n_x$ is measured in the machine direction of the film and $n_y$ is measured in the transverse direction.

Birefringence ($\Delta n$) of a wave plate may be measured by determining the birefringence of a wave plate over a wavelength range of about 400 nm to about 800 nm at different increments. Alternatively, birefringence may be measured at a specific light wavelength. Throughout this description, when a birefringence or retardation relation is given without specifying a wavelength, the relation occurs throughout the wavelength range of about 400 nm to about 800 nm.

Preferably, the in-plane retardation ($R_e$) of the optical compensation film of this invention ranges from about 80 nm to about 300 nm at the wavelength ($\lambda$) 550 nm. In a further aspect, the optical compensation film in accordance with this invention is a quarter wave plate having in-plane retardation ($R_e$) of about 100-160 nm at the wavelength ($\lambda$) 550 nm and having a normal in-plane dispersion characteristic. For purposes of this application, the term "quarter wave plate" includes Re values ranging from about (0.7) ($\lambda/4$) to about (1.3) ($\lambda/4$), or about (0.8) ($\lambda/4$) to about (1.2) ($\lambda/4$), or from about (0.85) ($\lambda/4$) to about (1.15) ($\lambda/4$), or from (0.9) ($\lambda/4$) to about (1.1) ($\lambda/4$).

Besides having a normal in-plane dispersion characteristic, the optical film of the present invention is capable of providing a low out-of-plane retardation ($R_{th}$) value. The low $R_{th}$ is desirable since it can increase the viewing angle and improve the quality of an image. Thus, this invention further provides a wide-view optical film having an out-of-plane retardation ($R_{th}$) that satisfies the equation of $|R_{th}| < 100$ nm, or $<80$ nm, or $<50$ nm, or $<30$ nm, or $<10$ nm, or $<5$ nm throughout the wavelength range of about 400 nm to about 800 nm. The term "$|R_{th}|$" means the absolute value of the out-of-plane retardation value $R_{th}$.

This wide-view feature due to the low $R_{th}$ characteristic of the optical film, when combined with the normal dispersion characteristic of the present invention, will provide a wide-view circular polarizer when used in combination with a linear polarizer. Such a circular polarizer can be used in a 3D glasses device to improve the viewing quality. The present invention may be used for example in 3D glasses for stereoscopic display devices such as those shown in U.S. Pat. Nos. 8,228,449, 8,310,528, 8,370,873, and 8,233,103.

Thus, this invention further provides a circular polarizer comprising a linear polarizer and a quarter wave plate of the present invention. In another embodiment, there is provided 3D glasses comprising a circular polarizer of the present invention.

Cellulose esters can be prepared by conventional methods by contacting the cellulose solution with one or more C1-C20 acylating reagents at a contact temperature and contact time sufficient to provide a cellulose ester with the desired degree of substitution (DS) and degree of polymerization (DP). The cellulose esters thus prepared generally comprise the following structure:

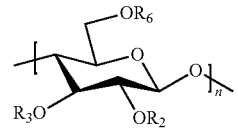

wherein $R_2$, $R_3$, $R_6$ are hydrogen, with the proviso that $R_2$, $R_3$, $R_6$ are not hydrogen simultaneously, or C1-C20 straight- or branched-chain alkyl or aryl groups bound to the cellulose via an ester linkage. Thus, a cellulose ester can have a DS up to 3. When a cellulose ester has a DS<3, it has unreacted hydroxyl groups. The degree of un-substituted OH is customary expressed as $DS_{OH}$.

The cellulose esters suitable for the present invention have a total degree of substitution of the acyl groups $DS_{acyl}$ from about 1.5 to about 3.0 (or $DS_{OH}$=0-1.5), preferably from about 2 to about 2.9 (or $DS_{OH}$=0.1-1.0), and more preferably from about 2.5 to about 2.8 (or $DS_{OH}$=0.15-0.5). Further examples of cellulose esters suitable for the present invention include cellulose acetate propionates having a degree of substitution of acetate, $DS_{Ac}$, ranging from about 0.13 to about 2.34, a degree of substitution of propionate, $DS_{Pr}$, ranging from about 0.85 to about 2.50, and a degree of substitution of hydroxyl, $DS_{OH}$, ranging from about 0.32 to about 1.08. Further examples of cellulose esters suitable for the present invention include cellulose acetate butyrate having a degree of substitution of acetate, $DS_{Ac}$, ranging from about 0.13 to about 2.34, a degree of substitution of butyrate, $DS_{Bu}$, ranging from about 0.85 to about 2.50, and a degree of substitution of hydroxyl, $DS_{OH}$, ranging from about 0.32 to about 1.08. Further examples of cellulose esters suitable for the present invention include cellulose acetate having a degree of substitution of acetate, $DS_{Ac}$ and a degree of substitution of hydroxyl, $DS_{OH}$, ranging from about 0.16 to about 0.56.

The cellulose esters suitable for the present invention have an inherent viscosity of greater than about 0.5 dL/g, or from about 0.7 to about 1.9 dL/g, or from about 0.8 to about 1.9 dig or from about 0.8 to about 1.5 dL/g, or about 0.8 to about 1.2 dL/g.

The preferred acylating reagents are one or more C1-C20 straight- or branched-chain alkyl or aryl carboxylic anhydrides, carboxylic acid halides, diketene, or acetoacetic acid esters. Examples of carboxylic anhydrides include, but are not limited to, acetic anhydride, propionic anhydride, butyric anhydride, isobutyric anhydride, valeric anhydride, hexanoic anhydride, 2-ethylhexanoic anhydride, nonanoic anhydride, lauric anhydride, palmitic anhydride, stearic anhydride, benzoic anhydride, substituted benzoic anhydrides, phthalic anhydride, and isophthalic anhydride. Examples of carboxylic acid halides include, but are not limited to, acetyl, propionyl, butyryl, hexanoyl, 2-ethylhexanoyl, lauroyl, palmitoyl, benzoyl, substituted benzoyl, and stearoyl chlorides. Examples of acetoacetic acid esters include, but are not limited to, methyl acetoacetate, ethyl acetoacetate, propyl acetoacetate, butyl acetoacetate, and tert-butyl acetoacetate. The most preferred acylating reagents are C2-C9 straight- or branched-chain alkyl carboxylic anhydrides selected from the group acetic anhydride, propionic anhydride, butyric anhydride, 2-ethylhexanoic anhydride, nonanoic anhydride, and stearic anhydride.

Cellulose esters useful in the present invention can be prepared by any known method for preparing cellulose esters. Examples of randomly substituted cellulose esters having various $DS_{OH}$ are described in US application 2009/0096962, which is incorporated in its entirety in this invention.

The optical film of this invention can be made by solution casting or melt extrusion. The solution cast film is prepared by mixing the cellulose ester polymer (a) with the additive (b) in a solvent, followed by casting of the resulting solution on a substrate. The film is obtained after the removal of the solvent. In the melt extrusion method, the cellulose ester polymer solid is mixed with the additive, followed by the extrusion of the mixture at a temperature higher than the glass transition temperature of the polymer.

Further, to obtain certain in-plane retardation $R_e$, the as-cast films are typically stretched. By adjusting the stretch conditions, such as, stretch temperature, stretch ratio, stretch type—uniaxial or biaxial, and controlling pre-heat time and temperature, post-stretch annealing time and temperature, the desired $R_e$, $R_{th}$ and normal optical dispersion can be achieved. The stretching temperature typically ranges from 130° C. to 200° C. The stretch ratio for MD typically ranges from 1.0 to 2.0. Pre-heat time typically ranges from 10 to 300 seconds, and pre-heat temperature is typically equal to stretch temperature. Post-annealing time typically ranges from 0 to 300 seconds, and post-annealing temperature typically ranges 10° C. to 40° C. below the stretching temperature.

In another embodiment of this invention, additives such as plasticizers, stabilizers, UV absorbers, antiblocks, slip agents, lubricants, dyes, pigments, retardation modifiers, etc. may optionally be mixed with the cellulose esters. Examples of these additives are found in US applications 2009/0050842, 2009/0054638, and 2009/0096962.

This invention can be further illustrated by the following examples of preferred embodiments thereof, although it will be understood that these examples are included merely for purposes of illustration and are not intended to limit the scope of the invention unless otherwise specifically indicated.

EXAMPLES

Example 1

Preparation of Cellulose Ester Film 1 Having Normal Dispersion Curve

A solution of cellulose ester polymer was prepared by mixing a cellulose acetate propionate (45 g) having DS of acetate ($DS_{AC}$)=0.18, DS of propionate ($DS_{Pr}$)=2.50, and $DS_{OH}$=0.32 in a solvent blend, methylene chloride/ethanol (90/10 wt. %), 363 g, followed by the addition of the additive, 2-naphthyl benzoate, 4.45 g. The resulting mixture was placed on a roller for 24 hours to yield a uniform solution.

The solution prepared above was cast onto a glass plate using a doctor blade to obtain a film with the desired thickness. Casting was conducted in a fume hood by an automatic drawdown machine. The relative humidity of the hood was controlled at 40%-50%. After casting, the film was allowed to dry for 45 minutes under a cover pan to minimize the rate of solvent evaporation. After the pan was removed, the film was allowed to dry for 15 more minutes and subsequently peeled off from the glass. The free standing film thus obtained was annealed in a forced air oven at 100° C. for 10 minutes and then at 120° C. for another 10 minutes. The thickness of the resulting film was determined to be ranging from 78 to 84 microns by using PosiTector®6000 (DeFelsko Corporation).

A non-constrained uniaxial stretching method was used for film stretching. The film prepared above was mounted on a stretching machine (Karo IV laboratory film stretcher available from Brückner) equipped with a heating chamber. The film was pre-heated for 25 seconds to reach the stretching temperature of 150° C. and subsequently stretched in the machine direction (MD) at a speed of 7.0 mm/sec to a stretch ratio ranging from 1.47 to 1.50. The transverse direction (TD) was left un-constrained or freed.

After stretching, the retardations ($R_{th}$ and $R_e$) of the cellulose ester films (CE-1) were measured by M-2000V Ellipsometer (J. A. Woollam Co.). The results from various stretching conditions are listed in Table 1, which shows the representative retardations at the wavelength 589 nm, $R_e(589)$ and $R_{th}(589)$, and the values of $R_e(450)/R_e(550)$ and $R_e(650)/R_e(550)$.

TABLE 1

Retardations of the Stretched Cellulose Film 1

| | Film Thickness After Stretching (microns) | Stretch Ratio (TD × MD), at 150° C. | $R_e(589)$, nm | $R_{th}(589)$, nm | $R_e(450)/R_e(550)$ | $R_e(650)/R_e(550)$ |
|---|---|---|---|---|---|---|
| CE-1a | 80 | 1 × 1.48 | 121.8 | −75.5 | 1.011 | 0.998 |
| CE-1b | 82 | 1 × 1.50 | 122.8 | −73.9 | 1.012 | 0.997 |
| CE-1c | 84 | 1 × 1.50 | 121.4 | −74.2 | 1.013 | 0.998 |
| CE-1c | 82 | 1 × 1.50 | 123.2 | −81.3 | 1.015 | 0.997 |
| CE-1e | 82 | 1 × 1.47 | 121.2 | −73.9 | 1.013 | 0.998 |
| CE-1f | 78 | 1 × 1.48 | 120.6 | −80.2 | 1.012 | 0.998 |

Example 2

Preparation of Cellulose Ester Film 2 Having Normal Dispersion Curve

A solution of cellulose ester polymer was prepared by mixing a cellulose acetate (45 g) having $DS_{Ac}$=2.84, $DS_{OH}$=0.16 in a solvent blend, methylene chloride/ethanol (92/8 wt. %), 357 g, followed by the addition of the additive, 2-naphthyl benzoate, 3.65 g. The resulting mixture was placed on a roller for 24 hours to yield a uniform solution.

The solution prepared above was cast onto a glass plate as described in Example 1 to obtain a film with the desired thickness. The resulting film (CE-2) was stretched according to Example 1 at various temperatures to a stretch ratio ranging from 1.25 to 1.40. The results are listed in Table 2.

TABLE 2

Retardations of the Stretched Cellulose Film 2

|  | Film Thickness After Stretching (microns) | Stretch Ratio (TD x MD) | $R_e(589)$, nm | $R_{th}(589)$, nm | $R_e(450)/R_e(550)$ | $R_e(650)/R_e(550)$ |
|---|---|---|---|---|---|---|
| CE-2a | 74 | 1 x 1.30 at 165° C. | 117.6 | −161.1 | 1.014 | 0.999 |
| CE-2b | 78 | 1 x 1.25 at 167.5° C. | 125.7 | −162.9 | 1.013 | 0.999 |
| CE-2c | 80 | 1 x 1.40 at 170° C. | 131.2 | −159.7 | 1.016 | 0.998 |

Example 3

Preparation of Cellulose Ester Film 3 Having Normal Dispersion Curve

A solution of cellulose ester polymer was prepared by mixing a cellulose acetate propionate (48 g) having $DS_{Ac}$=1.59, $DS_{Pr}$=0.85, $DS_{OH}$=0.56 in a solvent blend, methylene chloride/ethanol (90/10 wt. %), 352 g, followed by the addition of the additive, naphthalene, 4.8 g. The resulting mixture was placed on a roller for 24 hours to yield a uniform solution. The solution prepared above was cast onto a glass plate as described in Example 1 to obtain a film with the desired thickness. The resulting film (CE-3) was stretched according to Example 1 at 160° C. to a stretch ratio ranging from 1.06 to 1.08. The results are listed in Table 3.

TABLE 3

Retardations of the Stretched Cellulose Film 3

|  | Film Thickness After Stretching (microns) | Stretch Ratio (TD x MD) | $R_e(589)$, nm | $R_{th}(589)$, nm | $R_e(450)/R_e(550)$ | $R_e(650)/R_e(550)$ |
|---|---|---|---|---|---|---|
| CE-3a | 82 | 1 x 1.08 at 160° C. | 136.0 | −214.7 | 1.008 | 0.995 |
| CE-3b | 80 | 1 x 1.07 at 160° C. | 117.4 | −200.4 | 1.007 | 0.996 |
| CE-3c | 82 | 1 x 1.06 at 160° C. | 122.5 | −189.4 | 1.010 | 0.996 |

Example 4

Preparation of Cellulose Ester Film 4 Having Normal Dispersion Curve

A solution of cellulose ester polymer was prepared by mixing a cellulose acetate (43.2 g) having $DS_{Ac}$=2.44, $DS_{OH}$=0.56 in a solvent blend, methylene chloride/ethanol (90/10 wt. %), 352 g, followed by the addition of the additive, 2-naphthyl benzoate, 4.8 g. The resulting mixture was placed on a roller for 24 hours to yield a uniform solution.

The solution prepared above was cast onto a glass plate as described in Example 1 to obtain a film with the desired thickness. The resulting film (CE-4) was stretched according to Example 1 at various temperatures to a stretch ratio ranging from 1.06 to 1.08. The results are listed in Table 4.

TABLE 4

Retardations of the Stretched Cellulose Film 4

|  | Film Thickness After Stretching (microns) | Stretch Ratio (TD x MD) | $R_e(589)$, nm | $R_{th}(589)$, nm | $R_e(450)/R_e(550)$ | $R_e(650)/R_e(550)$ |
|---|---|---|---|---|---|---|
| CE-4a | 72 | 1 x 1.10 at 160° C. | 120.7 | −283.6 | 1.033 | 0.984 |
| CE-4b | 80 | 1 x 1.05 at 165° C. | 119.6 | −305.3 | 1.034 | 0.985 |

TABLE 4-continued

Retardations of the Stretched Cellulose Film 4

| | Film Thickness After Stretching (microns) | Stretch Ratio (TD × MD) | $R_e(589)$, nm | $R_{th}(589)$, nm | $R_e(450)/R_e(550)$ | $R_e(650)/R_e(550)$ |
|---|---|---|---|---|---|---|
| CE-4c | 66 | 1 × 1.30 at 165° C. | 143.7 | −317.5 | 1.037 | 0.982 |

Example 5

Preparation of Cellulose Ester Film 5 Having Normal Dispersion Curve

A solution of cellulose ester polymer was prepared by mixing a cellulose acetate propionate (43.2 g) having $DS_{Ac}=0.17$, $DS_{Pr}=1.75$, $DS_{OH}=1.08$ in a solvent blend, methylene chloride/ethanol (87/13 wt. %), 352 g, followed by the addition of the additive, 2-naphthyl benzoate, 4.8 g. The resulting mixture was placed on a roller for 24 hours to yield a uniform solution. The solution prepared above was cast onto a glass plate as described in Example 1 to obtain a film with the desired thickness. The resulting film (CE-5) was stretched according to Example 1 at 160° C. to a stretch ratio of 1.05 and 1.10 respectively. The results are listed in Table 5.

TABLE 5

Retardations of the Stretched Cellulose Film 5

| | Film Thickness After Stretching (microns) | Stretch Ratio (TD × MD) | $R_e(589)$, nm | $R_{th}(589)$, nm | $R_e(450)/R_e(550)$ | $R_e(650)/R_e(550)$ |
|---|---|---|---|---|---|---|
| CE-5a | 66 | 1 × 1.10 at 160° C. | 174.5 | −230.5 | 1.029 | 0.984 |
| CE-5b | 74 | 1 × 1.05 at 160° C. | 138.4 | −231.4 | 1.028 | 0.985 |

Comparative Example 1

Preparation of Cellulose Ester Film 6 without Additive

This example illustrates the effect of a cellulose ester film without the inventive additive on the wavelength dispersion. A solution of cellulose ester polymer was prepared according to Example 1 using the same cellulose ester but without the addition of 2-naphthyl benzoate. Film was cast accordingly from the solution. The film (CE-6) was stretched at 165° C. to a stretch ratio ranging from 1.50 to 1.80. The results are listed in Table 6. As indicated by the values of $R_e(450)/R_e(550)$ and $R_e(650)/R_e(550)$, the film yielded steep reversed dispersion curves after stretching. Further, a desirable $R_e$ cannot be obtained even with high stretch ratios.

TABLE 6

Retardations of the Stretched Cellulose Film 6

| | Film Thickness After Stretching (microns) | Stretch Ratio (TD × MD) | $R_e(589)$, nm | $R_{th}(589)$, nm | $R_e(450)/R_e(550)$ | $R_e(650)/R_e(550)$ |
|---|---|---|---|---|---|---|
| CE-6a | 78 | 1 × 1.50 at 165° C. | 47.4 | −30.1 | 0.757 | 1.128 |
| CE-6b | 74 | 1 × 1.60 at 165° C. | 42.4 | −37.9 | 0.688 | 1.162 |
| CE-6c | 74 | 1 × 1.70 at 165° C. | 49.1 | −35.9 | 0.657 | 1.178 |

TABLE 6-continued

Retardations of the Stretched Cellulose Film 6

| | Film Thickness After Stretching (microns) | Stretch Ratio (TD × MD) | $R_e(589)$, nm | $R_{th}(589)$, nm | $R_e(450)/R_e(550)$ | $R_e(650)/R_e(550)$ |
|---|---|---|---|---|---|---|
| CE-6d | 72 | 1 × 1.80 at 165° C. | 55.9 | −36.8 | 0.666 | 1.177 |
| CE-6e | 70 | 1 × 1.90 at 165° C. | 46.2 | −36.2 | 0.624 | 1.194 |

Comparative Example 2

Preparation of Cellulose Ester Film 7 with a Non-Inventive Additive

This example illustrates the effect of a non-inventive additive on the wavelength dispersion. A solution of cellulose ester polymer was prepared by mixing a cellulose acetate propionate (43.2 g) having $DS_{Ac}$=0.17, $DS_{Pr}$=1.78, $DS_{OH}$=1.05 in a solvent blend, methylene chloride/ethanol (87/13 wt. %), 373 g, followed by the addition of the additive, triacetin, 7.62 g. The resulting mixture was placed on a roller for 24 hours to yield a uniform solution.

The solution prepared above was cast onto a glass plate as described in Example 1 to obtain a film with the desired thickness. The resulting film (CE-7) was stretched according to Example 1 at 175° C. to a stretch ratio ranging from 1.40 to 1.45. The results are listed in Table 7. As indicated by the values of $R_e(450)/R_e(550)$ and $R_e(650)/R_e(550)$, the film yielded reversed dispersion curves after stretching.

TABLE 7

Retardations of the Stretched Cellulose Film 7

| | Film Thickness After Stretching (microns) | Stretch Ratio (TD × MD) | $R_e(589)$, nm | $R_{th}(589)$, nm | $R_e(450)/R_e(550)$ | $R_e(650)/R_e(550)$ |
|---|---|---|---|---|---|---|
| CE-7a | 104 | 1 × 1.40 at 175° C. | 126.4 | −71.2 | 0.986 | 1.005 |
| CE-7b | 102 | 1 × 1.45 at 175° C. | 137.6 | −77.4 | 0.986 | 1.005 |

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A uniaxially or biaxially stretched optical film comprising:
   (a) a cellulose ester polymer; and
   (b) an additive having the structure below:

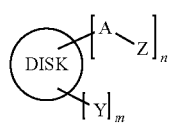

wherein
DISK represents a naphthalene group;
A is —OOC—;
Z is an aryl group having 6 to 30 carbon atoms;
Y is each independently a halogen or an alkyl, alkoxy, or alkanoyl group having 1 to 20 carbon atoms;
m=0, 1, 2, 3, or 4; and
n=0, 1, 2, or 3.

2. The optical film of claim 1, wherein the cellulose ester polymer is selected from the group consisting of cellulose acetate, cellulose acetate propionate), and cellulose acetate butyrate.

3. The optical film of claim 2, wherein the cellulose ester polymer has a degree of substitution of hydroxyl ($DS_{OH}$) ranging from 0.1 to 1.

4. The optical film of claim 2, wherein the cellulose ester polymer has a degree of substitution of hydroxyl ($DS_{OH}$) ranging from 0.15 to 0.5.

5. The optical film of claim 1, wherein the additive is 2-naphthyl benzoate.

6. The optical film of claim 1, wherein the cellulose ester polymer is selected from the group consisting of cellulose acetate (CA), cellulose acetate propionate (CAP), and cellulose acetate butyrate (CAB) and the additive is 2-naphthyl benzoate.

7. The optical film of claim 1, which is made by solution casting.

8. The optical film of claim 1, which is made by melt extrusion.

9. A circular polarizer comprising the optical film of claim 1 and a linear polarizer.

10. 3D glasses comprising the optical film of claim 1.

11. A quarter wave plate having a normal wavelength dispersion curve, wherein the plate comprises the optical film according to claim 1 and satisfies the following equations:

$$R_e(450)/R_e(550) > 1 \text{ and}$$

$$R_e(650)/R_e(550) < 1$$

wherein $R_e(450)$, $R_e(550)$, and $R_e(650)$ are in-plane retardations at the light wavelengths of 450 nm, 550 nm, and 650 nm, respectively.

12. The plate of claim 11, which has an in-plane retardation ($R_e$) of about 100-160 nm at the wavelength ($\lambda$) 550 nm.

13. The plate of claim 11, which has an out-of-plane retardation ($R_{th}$) that satisfies the equation of $|R_{th}|<100$ nm.

14. The plate of claim 11, which has an in-plane retardation ($R_e$) of about 100-160 nm at the wavelength ($\lambda$) 550 nm and an out-of-plane retardation ($R_{th}$) that satisfies the equation of $|R_{th}|<100$ nm.

15. The plate of claim 11, wherein $R_e(450)/R_e(550)$ is 1.001 to 1.1 and $R_e(650)/R_e(550)$ is 0.95 to 0.999.

16. The plate of claim 11, wherein $R_e(450)/R_e(550)$ is 1.01 to 1.06 and $R_e(650)/R_e(550)$ is 0.97 to 0.993.

17. The plate of claim 11, wherein the cellulose ester polymer is selected from the group consisting of cellulose acetate (CA), cellulose acetate propionate (CAP), and cellulose acetate butyrate (CAB); the additive is 2-naphthyl benzoate; $R_e(450)/R_e(550)$ is 1.01 to 1.06; and $R_e(650)/R_e(550)$ is 0.97 to 0.993.

18. A circular polarizer comprising the plate of claim 11 and a linear polarizer.

19. 3D glasses comprising the plate of claim 11.

20. A uniaxially or biaxially stretched optical film comprising:
   (a) a cellulose ester polymer and
   (b) an additive having the structure below:

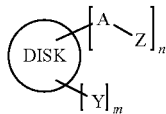

wherein DISK represents a disk-like moiety having a fused ring structure, A is each independently —COO—, —OOC—, —CO—, —CONH—, —NHCO—, —O—, or —S—; Z is each independently an aryl, alkyl, ethoxylated alkyl, or ethoxylated aryl group, having 1 to 30 carbon atoms; Y is each independently a halogen or an alkyl, alkoxy, or alkanoyl group, having 1 to 20 carbon atoms, m=0, 1, 2, 3, or 4; n is the number of the independent -A-Z substituents on the DISK, n=0, 1, 2, or 3; and wherein the additive is 2-naphthyl benzoate.

21. A uniaxially or biaxially stretched optical film comprising:
   (a) a cellulose ester polymer; and
   (b) an additive having the structure below:

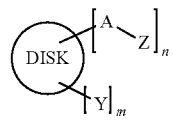

wherein DISK represents a disk-like moiety having a fused ring structure, A is each independently —COO—, —OOC—, —CO—, —CONH—, —NHCO—, —O—, or —S—; Z is each independently an aryl, alkyl, ethoxylated alkyl, or ethoxylated aryl group, having 1 to 30 carbon atoms; Y is each independently a halogen or an alkyl, alkoxy, or alkanoyl group, having 1 to 20 carbon atoms, m=0, 1, 2, 3, or 4; n is the number of the independent -A-Z substituents on the DISK, n=0, 1, 2, or 3; and wherein the cellulose ester polymer is selected from the group consisting of cellulose acetate (CA), cellulose acetate propionate (CAP), and cellulose acetate butyrate (CAB) and the additive is 2-naphthyl benzoate.

22. The optical film of claim 20 or 21, which is made by solution casting.

23. The optical film of claim 20 or 21, which is made by melt extrusion.

24. A circular polarizer comprising the optical film of claim 20 or 21 and a linear polarizer.

25. 3D glasses comprising the optical film of claim 20 or 21.

* * * * *